United States Patent
Wang et al.

(10) Patent No.: US 11,822,887 B2
(45) Date of Patent: Nov. 21, 2023

(54) ROBUST NAME MATCHING WITH REGULARIZED EMBEDDINGS

(71) Applicant: ADOBE INC., San Jose, CA (US)

(72) Inventors: Lidan Wang, San Jose, CA (US); Franck Dernoncourt, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 0 days.

(21) Appl. No.: 17/199,963

(22) Filed: Mar. 12, 2021

(65) Prior Publication Data

US 2022/0292263 A1  Sep. 15, 2022

(51) Int. Cl.
*G06F 40/295* (2020.01)
*G06F 40/126* (2020.01)
*G06N 3/049* (2023.01)

(52) U.S. Cl.
CPC .......... *G06F 40/295* (2020.01); *G06F 40/126* (2020.01); *G06N 3/049* (2013.01)

(58) Field of Classification Search
CPC .................. G06F 40/295; G06F 40/126; G06F 16/90344; G06N 3/049
See application file for complete search history.

(56) References Cited

U.S. PATENT DOCUMENTS

| | | | | |
|---|---|---|---|---|
| 6,282,529 B1* | 8/2001 | Neuneier | ............... | G06K 9/627 706/15 |
| 11,295,088 B2* | 4/2022 | Bellegarda | ............ | G06F 40/274 |
| 2007/0085716 A1* | 4/2007 | Bar-Yossef | ....... | G06F 16/90344 341/87 |
| 2018/0069875 A1* | 3/2018 | Ben Ezra | ............ | H04L 63/1441 |
| 2018/0308003 A1* | 10/2018 | Singh | ..................... | G06N 5/003 |
| 2018/0332082 A1* | 11/2018 | Baumgart | ............... | G06F 21/34 |
| 2021/0287069 A1* | 9/2021 | Mumcuyan | ........... | G06F 40/295 |

OTHER PUBLICATIONS

Hosseini et al. DeezyMatch: A Flexible Deep Learning Approach to Fuzzy String Matching. Proceedings of the 2020 EMNLP (Systems Demonstrations), pp. 62-69 Nov. 16-20, 2020. (c) 2020 Association for Computational Linguistics (Year: 2020).*
Cho et al. Learning Phrase Representations using RNN Encoder-Decoder for Statistical Machine Translation. Proceedings of the 2014 Conference on Empirical Methods in Natural Language Processing (EMNLP), pp. 1724-1734, Oct. 25-29, 2014, Doha, Qatar. c 2014 Association for Computational Linguistics. (Year: 2014).*

(Continued)

*Primary Examiner* — Tadesse Hailu
(74) *Attorney, Agent, or Firm* — F. CHAU & ASSOCIATES, LLC

(57) ABSTRACT

Systems and methods for natural language processing are described. One or more embodiments of the disclosure provide an entity matching apparatus trained using machine learning techniques to determine whether a query name corresponds to a candidate name based on a similarity score. In some examples, the query name and the candidate name are encoded using a character encoder to produce a regularized input sequence and a regularized candidate sequence, respectively. The regularized input sequence and the regularized candidate sequence are formed from a regularized character set having fewer characters than a natural language character set.

18 Claims, 8 Drawing Sheets

(56) References Cited

OTHER PUBLICATIONS

Hochreiter et al. Long Short-Term Memory. Neural Computation 9(8): pp. 1735-1780, 1997. (Year: 1997).*
Cigar. Entry at BITS wiki. Last modified Feb. 16, 2012. Retrieved from [https://wiki.bits.vib.be/index.php/CIGAR] on [Jul. 12, 2022]. 1 page. (Year: 2012).*
Kant et al. An Ensemble approach to large-scale fuzzy name matching. Article posted at Medium.com on Mar. 28, 2019. Retrieved from [https://medium.com/bcggamma/an-ensemble-approach-to-large-scale-fuzzy-name-matching-b3e3fa124e3c] on [May 11, 2022]. 20 pages. (Year: 2019).*
Szulicki. Phonetic Matching Algorithms. Article posted at Medium.com on Apr. 12, 2019/ Retrieved from [https://medium.com/@ievgenii.shulitskyi/phonetic-matching-algorithms-50165e684526] on [Jun. 3, 2022]. 9 pages. (Year: 2019).*
Gong et al. Matching Person Names through Name Transformation. CIKM'09, Nov. 2-6, 2009. Hong Kong, China Copyright 2009 ACM 978-1-60558-512-3/09/11. pp. 1875-1878. (Year: 2009).*
Fan et al. Cigar Strings for Dummies. Blog entry post made Mar. 28, 2017. Retrieved from [https://jef.works/blog/2017/03/28/CIGAR-strings-for-dummies/] on [Nov. 1, 2022]. 4 pages. (Year: 2017).*
1Neculoiu, et al., "Learning Text Similarity with Siamese Recurrent Networks", In Proceedings of the 1st Workshop on Representation Learning for NLP, (2016), (pp. 148-157).

\* cited by examiner

ROBUST NAME MATCHING WITH REGULARIZED EMBEDDINGS

BACKGROUND

The following relates generally to natural language processing, and more specifically to entity matching using machine learning techniques.

Natural language processing (NLP) refers to techniques for using computers to interpret natural language. In some cases, NLP tasks involve assigning annotation data such as grammatical information to words or phrases within a natural language expression. Entity matching is a sub-category of NLP that includes structural and semantic-based identification of similarities between an input entity (i.e., an input name) and a matched entity (i.e., a matched name).

Neural networks have been used to find matching entities in a corpus of text. However, conventional NLP networks rely on the assumption that certain character or word sequences are observed frequently in datasets. As a result, these systems are not efficient in processing infrequent or out-of-domain character sequences.

Therefore, there is a need in the art for improved entity matching systems that can match infrequent character sequences.

SUMMARY

The present disclosure describes systems and methods for natural language processing. One or more embodiments of the disclosure provide an entity matching apparatus trained using machine learning techniques to determine whether a query name corresponds to a candidate name based on a similarity score. In some examples, the query name and the candidate name are encoded using a character encoder to produce a regularized input sequence and a regularized candidate sequence, respectively. The regularized input sequence and the regularized candidate sequence are formed from a regularized character set having fewer characters than a natural language character set.

A method, apparatus, and non-transitory computer readable medium for natural language processing are described. One or more embodiments of the method, apparatus, and non-transitory computer readable medium include identifying an input name and a candidate name, wherein the input name and the candidate name are words formed from a natural language character set, encoding the input name and the candidate name to produce a regularized input sequence and a regularized candidate sequence, respectively, wherein the regularized input sequence and the regularized candidate sequence are formed from a regularized character set having fewer characters than the natural language character set, embedding the regularized input sequence and the regularized candidate sequence to produce an embedded input vector and an embedded candidate vector, respectively, computing a similarity score based on the embedded input vector and the embedded candidate vector, and indicating that the input name corresponds to the candidate name based on the similarity score.

An apparatus and method for natural language processing are described. One or more embodiments of the apparatus and method include a character encoder configured to encode an input name and a candidate name to produce a regularized input sequence and a regularized candidate sequence, respectively, wherein the regularized input sequence and the regularized candidate sequence are formed from a regularized character set having fewer characters than a natural language character set of the input name and the candidate name, a character embedding component configured to embed each character of the regularized input sequence and the regularized candidate sequence to produce regularized input character embeddings and regularized candidate character embeddings, respectively, a word embedding component configured to embed the regularized input character embeddings and the regularized candidate character embeddings to produce an embedded input vector and an embedded candidate vector, respectively, and a scoring component configured to compute a similarity score based on the embedded input vector and the embedded candidate vector.

A method, apparatus, and non-transitory computer readable medium for training a machine learning model are described. One or more embodiments of the method, apparatus, and non-transitory computer readable medium include identifying a training pair comprising an input name and a candidate name, and further comprising a ground truth match information indicating whether the input name corresponds to the candidate name, encoding the input name and the candidate name to produce a regularized input sequence and a regularized candidate sequence, respectively, wherein the regularized input sequence and the regularized candidate sequence are formed from a regularized character set having fewer characters than a natural language character set, embedding the regularized input sequence and the regularized candidate sequence to produce an embedded input vector and an embedded candidate vector, respectively, using a word embedding component, computing a similarity score based on the embedded input vector and the embedded candidate vector, computing a loss function based on the similarity score and the ground truth match information, and updating parameters of the word embedding component based on the loss function.

DETAILED DESCRIPTION

Figure 1:
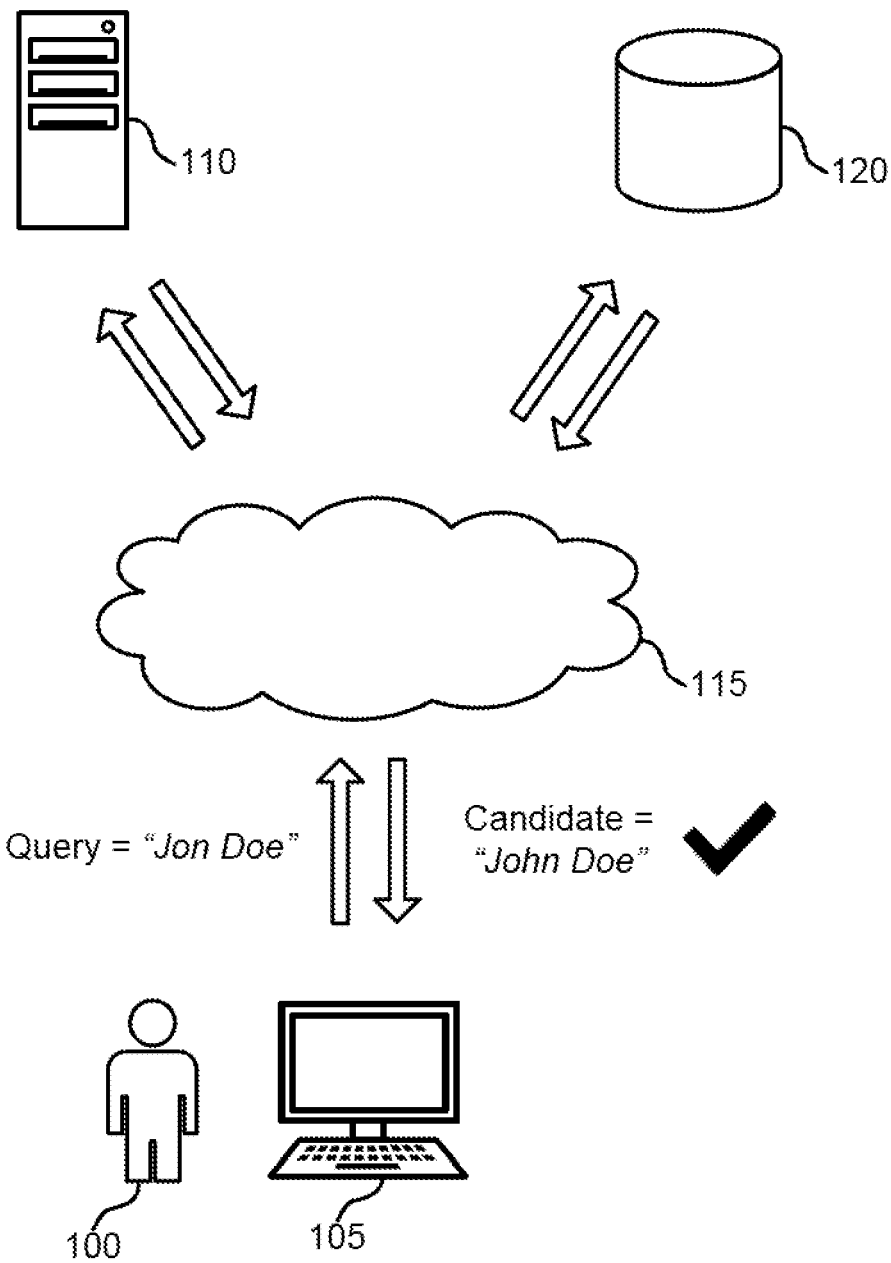
FIG. 1 shows an example of a system for natural language processing according to aspects of the present disclosure.

The present disclosure describes systems and methods for natural language processing. One or more embodiments of the disclosure provide an entity matching apparatus trained using machine learning techniques to determine whether an input name corresponds to a candidate name based on a similarity score. In some examples, the input name and the candidate name are encoded using a character encoder of the name entity apparatus to produce a regularized input sequence and a regularized candidate sequence, respectively. Furthermore, the regularized input sequence and the regularized candidate sequence are formed from a regularized character set having fewer characters than a natural language character set.

Entity matching includes identifying structural and syntactic similarities between an input name and a matched name. Entity matching is used in a variety of applications, including search applications. Efficient and accurate named entity search is important in providing a good user experience since entities represent a high volume of user search queries.

NLP systems (e.g., sequential language models) have been developed based on observing frequent sub-sequences across a pair of input sequences. In some examples, NLP systems include a long short-term memory (LSTM) network, or bidirectional encoder representations from transformers (BERT) network for input sequence representation. However, conventional entity matching systems are limited to certain character or word sequences that are observed frequently in the datasets. In many cases, user search queries include infrequent character sequences (e.g., "Aislinn", "Caocao", or a misspelled name). Existing systems are not robust to rare input sequences or out-of-domain character sequences. As a result, the performance of these NLP systems is decreased.

One or more embodiments of the present disclosure provide an improved entity matching apparatus that can match infrequent character sequences and indicates whether a query name corresponds to a candidate name. In some examples, an entity matching network includes a deep learning network comprising a transformer network or an LSTM network.

By applying the unconventional step of encoding the input name and the candidate name using characters from a regularized character set having fewer characters than a natural language character set, one or more embodiments of the present disclosure provide an entity matching network that is efficient in training and accurate at inference time. In some cases, a supervised learning approach may be used for updating parameters of a word embedding component of the network. In some examples, the improved entity matching apparatus can be used to search named entities and manage a large amount of user documents on a cloud (e.g., Adobe® document cloud), leading to improved user query search experience.

One or more embodiments of the present disclosure may be used in the context of query search and document management. For example, an entity matching network based on the present disclosure may be used to indicate whether a query name corresponds to a candidate name. For example, users of Adobe® Document Cloud (DC) may query a file name on a search engine to automatically retrieve relevant or similar file names from a collection of documents. A user may input a misspelled query and/or aim to retrieve documents that have similar names as the query to be included in the returned results.

Figure 2:
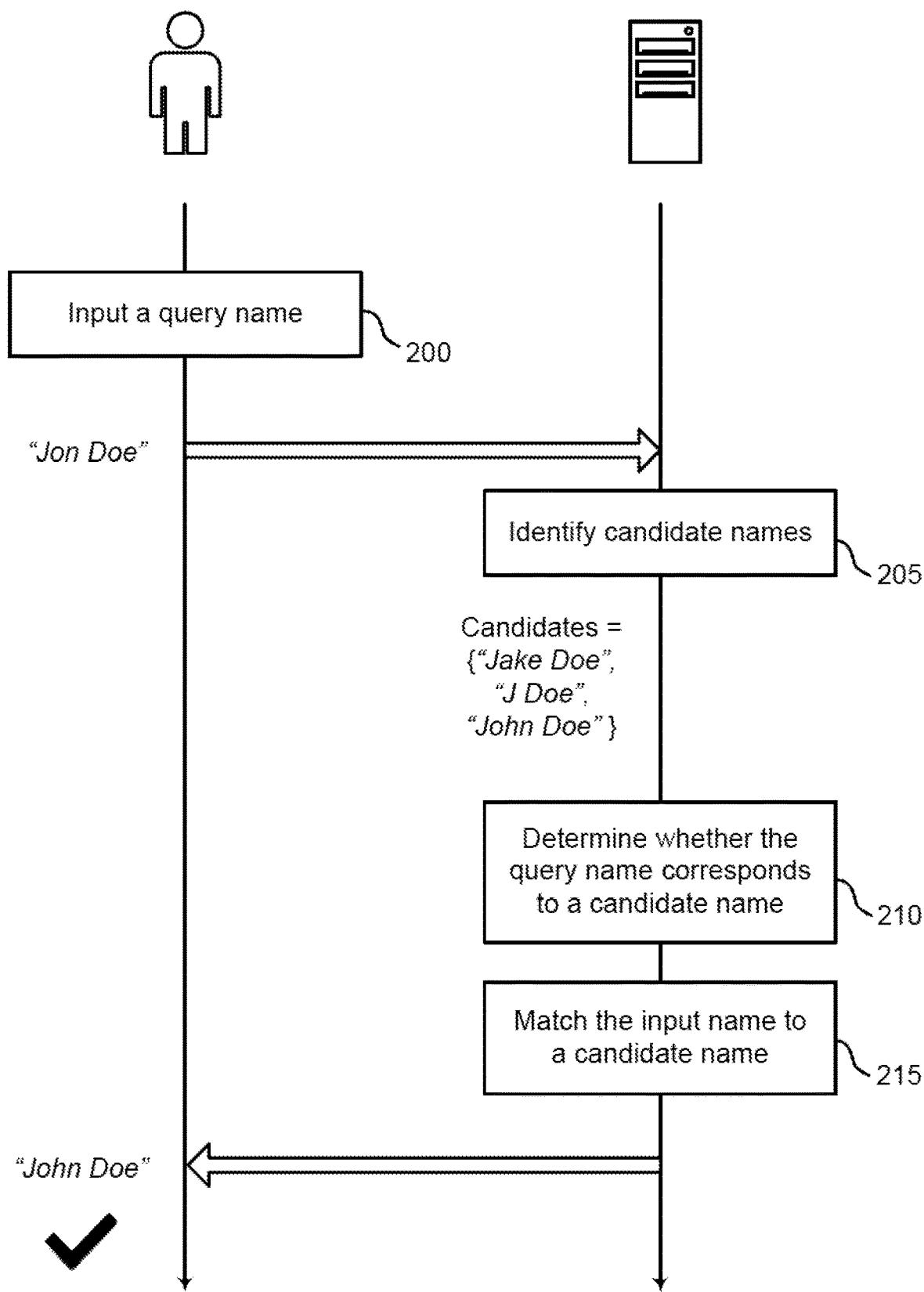
FIG. 2 shows an example of name entity matching according to aspects of the present disclosure.

An example of an application of the inventive concept in entity matching is provided with reference to FIGS. 1 and 2. Detail regarding the architecture of an example entity matching apparatus are provided with reference to FIGS. 3, 4, and 5. Examples of an entity matching process are provided with reference to FIGS. 6 and 7. A description of an example training process is described with reference to FIG. 8.

Entity Matching Application

FIG. 1 shows an example of a system for natural language processing according to aspects of the present disclosure. The example shown includes user 100, user device 105, entity matching apparatus 110, cloud 115, and database 120.

In the example of FIG. 1, the user 100 communicates with the entity matching apparatus 110, e.g., via the user device 105 and the cloud 115. For example, the user 100 may input a search query (e.g., an input name "Jon Doe"). The entity matching apparatus 110 receives the input name. The entity matching apparatus 110 also identifies one or more candidate names (e.g., "John Doe", "Jake Doe", and "J Doe"). A character encoder of the entity matching apparatus 110 encodes the input name and the candidate name to produce a regularized input sequence and a regularized candidate sequence, respectively. The regularized input sequence and the regularized candidate sequence are formed from a regularized character set. In some examples, the regularized character set includes a matching character, a non-matching character, and at least one gap character.

The user device 105 transmits the input name ("Jon Doe") to the entity matching apparatus 110 for entity matching between the input name and a selected candidate name (e.g., "John Doe"). Other example candidate names (e.g., "Jake Doe", "J Doe") may also be selected for entity matching with the input name one at a time. In some embodiments, the entity matching apparatus 110 is located on the user device 105. In some cases, a set of candidate names are stored in the database 120 for retrieval by the entity matching apparatus 110.

The entity matching apparatus 110 may include an LSTM network or a transformer network configured to embed the regularized input sequence and the regularized candidate sequence to produce an embedded input vector and an embedded candidate vector, respectively. A scoring component of the entity matching apparatus 110 is configured to compute a similarity score based on the embedded input vector and the embedded candidate vector. The entity matching apparatus 110 indicates that the input name ("Jon Doe") corresponds to the candidate name ("John Doe") based on the similarity score. The candidate name is presented to the user 100 on the user device 105. The user 100 may choose to alter the query forming a different input name (e.g., "J_ _ _ Doe", "Jake Doe", etc.) for further entity search and matching.

The user device 105 may be a personal computer, laptop computer, mainframe computer, palmtop computer, personal assistant, mobile device, or any other suitable processing apparatus. In some examples, the user device 105 includes software that incorporates an entity matching function (e.g., a search engine). The entity matching application may either include or communicate with the entity matching apparatus 110.

The entity matching apparatus 110 includes a computer implemented network comprising a character encoder, a character embedding component, a word embedding component and a scoring component. The network encodes an input name and a candidate name to produce a regularized input sequence and a regularized candidate sequence, respectively, using the character encoder. The network embeds each character of the regularized input sequence and the regularized candidate sequence to produce regularized input character embeddings and regularized candidate character embeddings, respectively, using the character embedding component. The network embeds the regularized input character embeddings and the regularized candidate character embeddings to produce an embedded input vector and an embedded candidate vector, respectively, using the word embedding component. Furthermore, the network computes a similarity score based on the embedded input vector and the embedded candidate vector using the scoring component.

The entity matching apparatus 110 may also include a processor unit, a memory unit, and a training component. The training component is used to train the entity matching network. Additionally, the entity matching apparatus 110 can communicate with the database 120 via the cloud 115. In some cases, the architecture of the entity matching network is also referred to as a network model. Further detail regarding the architecture of the entity matching apparatus 110 is provided with reference to FIGS. 3, 4, and 5. Further detail regarding the operation of the entity matching apparatus 110 is provided with reference to FIGS. 6 and 7.

In some cases, the entity matching apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data (e.g., a corpus of documents to be searched). For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

FIG. 2 shows an example of name entity matching according to aspects of the present disclosure. In some examples, these operations are performed by a system as in claim 1. The system includes a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system inputs a query name. According to the example from FIG. 1, the query name is "Jon Doe". In some cases, the operations of this step refer to, or may be performed by, a user device as described with reference to FIG. 1. As used herein, the term "name" can refer to any entity, either a proper name or any other entity.

At operation 205, the system identifies one or more candidate names (e.g., "John Doe, Jake Doe, and J Doe"). An example candidate name may be selected for evaluation (e.g., "John Doe") one at a time. In some cases, the operations of this step refer to, or may be performed by, an entity matching network as described with reference to FIG. 3.

At operation 210, the system determines whether the query name corresponds to each of the candidate names. The system takes a query name and a candidate name as inputs. In some cases, the operations of this step refer to, or may be performed by, an entity matching network as described with reference to FIG. 3.

In some embodiments, the input sequences (e.g., the query name and the candidate name collectively) are mapped into regularized embedding sequences corresponding to a new set of vocabulary derived from global sequence alignment between the query name ("Jon Doe") and the candidate name ("John Doe"). The new vocabulary is agnostic to the exact characters in the input sequences and depends exclusively on the matching patterns between character pairs from the query name and the candidate name.

For example, the matching pattern may be a unique coding denoting one of the following classes at each position from the global sequence alignment. The regularized character set (i.e., classes) includes a matching character, a non-matching character, and at least one gap character. In some cases, the characters are selected from the regularized character set using a per position alignment approach. In some cases, the input name and the candidate name are collectively referred to as input sequences.

The alignment patterns between the input name and the candidate name enable the creation of two new sequences denoting the matching patterns between the input sequences and not the exact characters from the input sequences. In the example above, the system aligns the "Jon Doe" to become "Jo_n Doe", and encodes this as {M, M, G1, M, M, M, M, M}. "G1" denotes an empty character (i.e., a gap corresponding to the letter "h" that is inserted based on the alignment) matched with a non-empty character (i.e., "h"). The name "Jan Doe" may be encoded as { M, N, G1, M, M, M, M, M}. "M" denotes a non-empty character matched with a non-empty character. "N" denotes a non-empty character not matched with an empty character. The system encodes "John Doe" to {M, M, G2, M, M, M, M, M}. "G2" denotes a non-empty character (i.e., "h") matched with an empty character (i.e., "_"). Thus, a segment number (e.g., 1 or 2) is associated with "G" for each respective encoding of the input name and the candidate name.

At operation 215, the system matches the input name to a candidate name. In some cases, the operations of this step refer to, or may be performed by, an entity matching network as described with reference to FIG. 3.

Network Architecture

Figure 3:
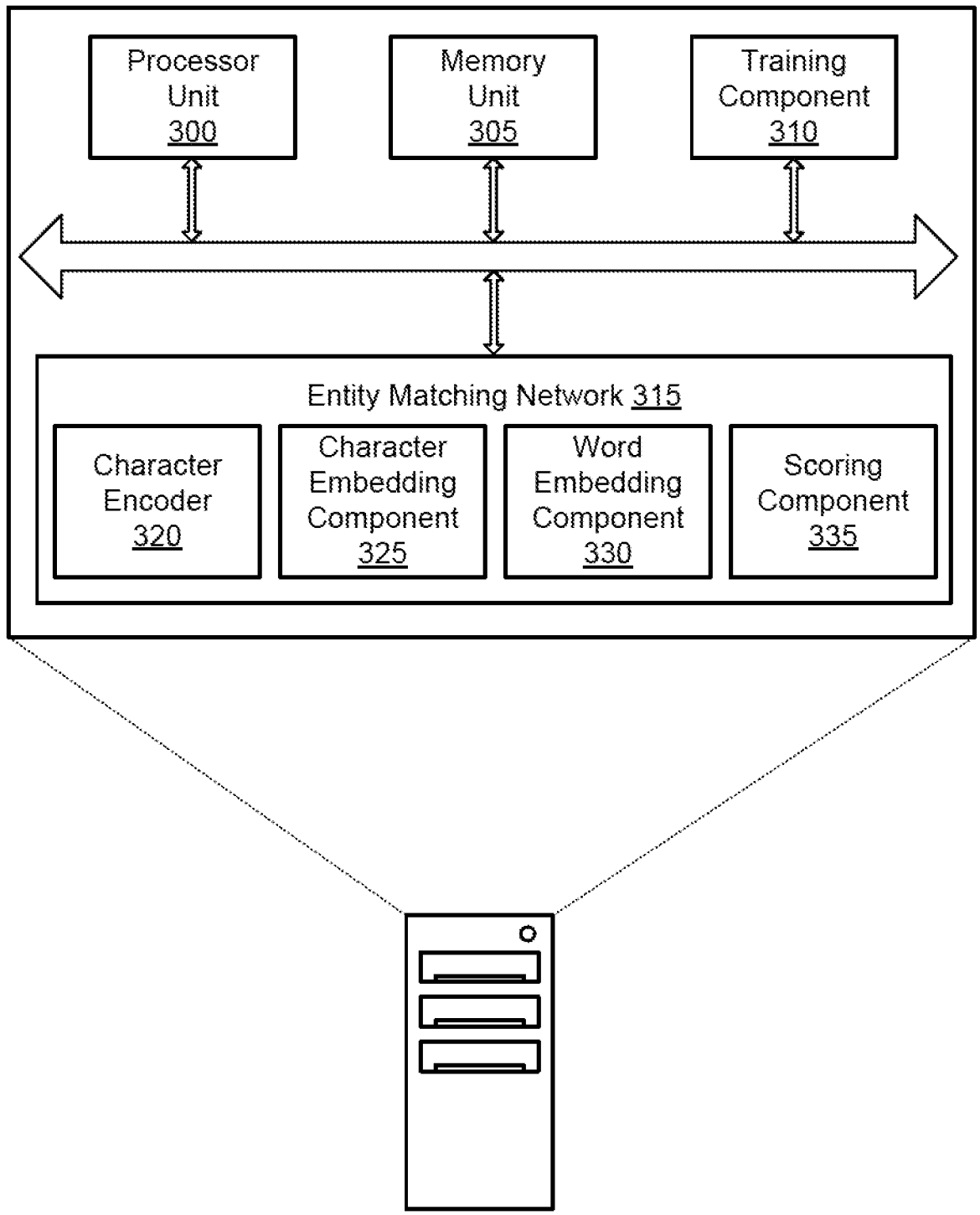
FIG. 3 shows an example of an entity matching apparatus according to aspects of the present disclosure.
Figure 4:
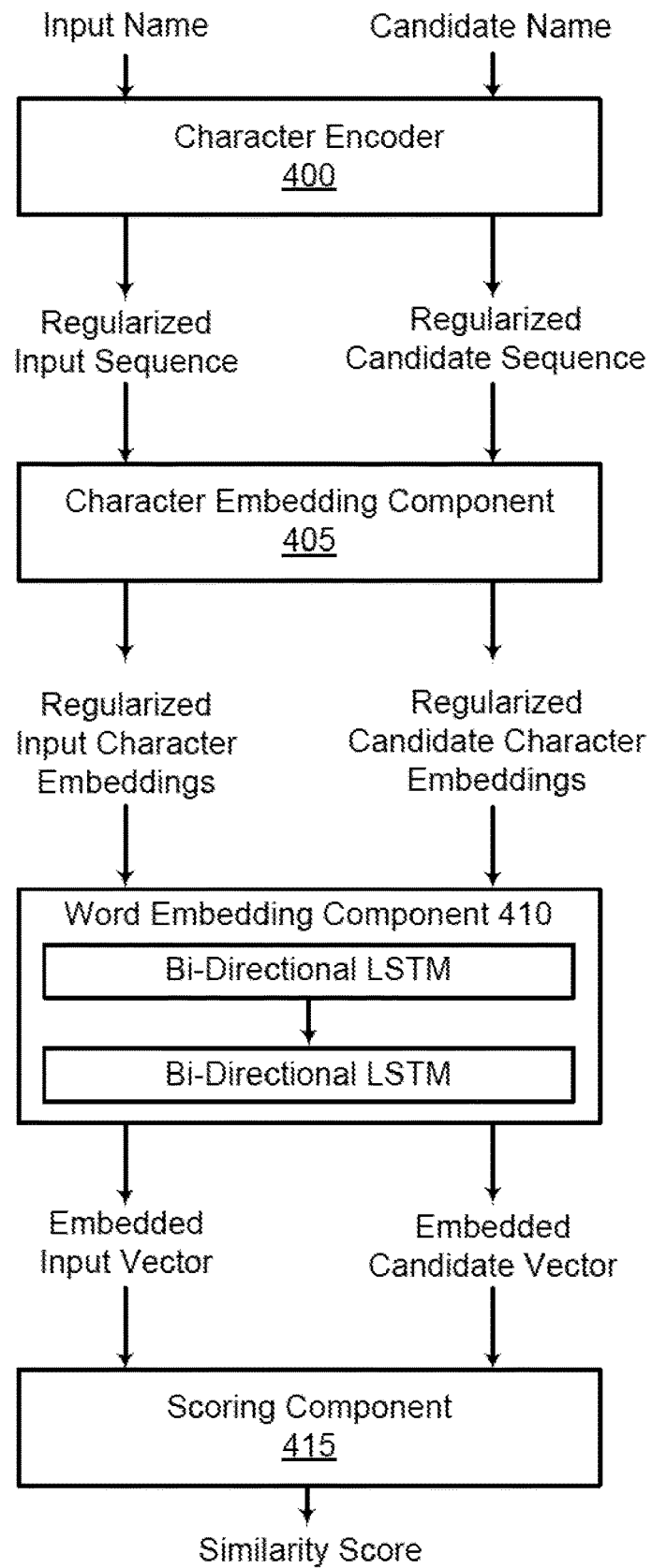
FIG. 4 shows an example of an entity matching network using a long short-term memory (LSTM) network according to aspects of the present disclosure.
Figure 5:
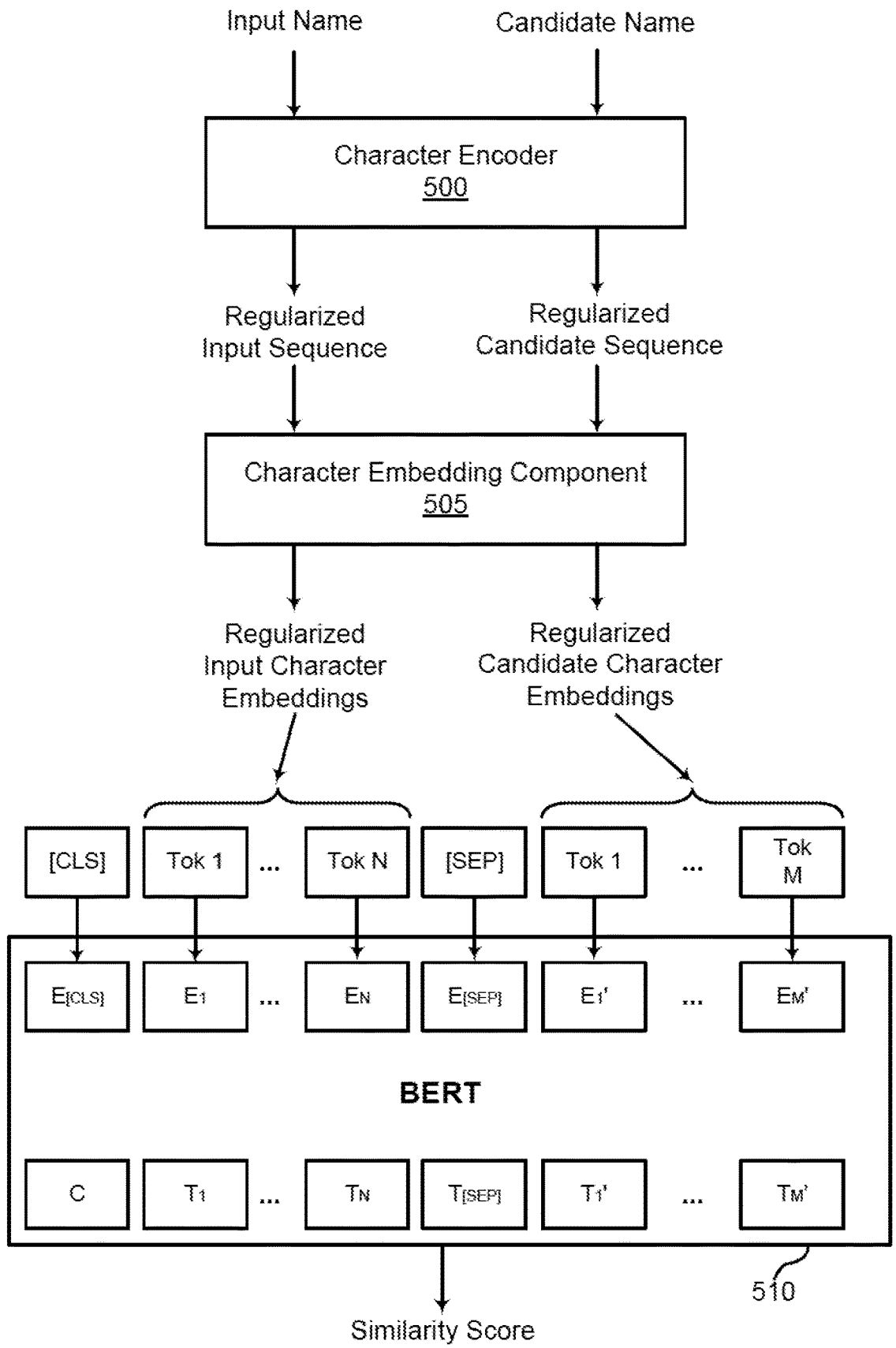
FIG. 5 shows an example of an entity matching network using a transformer network according to aspects of the present disclosure.

In FIGS. 3-5, an apparatus and method for natural language processing are described. One or more embodiments of the apparatus and method include a character encoder configured to encode an input name and a candidate name to produce a regularized input sequence and a regularized candidate sequence, respectively, wherein the regularized input sequence and the regularized candidate sequence are formed from a regularized character set having fewer characters than a natural language character set of the input name and the candidate name, a character embedding component configured to embed each character of the regularized input sequence and the regularized candidate sequence to produce regularized input character embeddings and regularized candidate character embeddings, respectively, a word embedding component configured to embed the regularized input character embeddings and the regularized candidate character embeddings to produce an embedded input vector and an embedded candidate vector, respectively, and a scoring component configured to compute a similarity score based on the embedded input vector and the embedded candidate vector.

In some examples, the word embedding component comprises an LSTM network. In some examples, the word embedding component comprises a transformer network. In some examples, the regularized character set includes a matching character, a non-matching character, and at least one gap character.

FIG. 3 shows an example of an entity matching apparatus according to aspects of the present disclosure. The example shown includes processor unit 300, memory unit 305, training component 310, and entity matching network 315. The entity matching apparatus is an example of, or includes aspects of, the corresponding element described with reference to FIG. 1.

In one embodiment, the entity matching apparatus includes a character encoder 320 configured to encode an input name and a candidate name to produce a regularized input sequence and a regularized candidate sequence, respectively, wherein the regularized input sequence and the regularized candidate sequence are formed from a regularized character set having fewer characters than a natural language character set of the input name and the candidate name, a character embedding component 325 configured to embed each character of the regularized input sequence and the regularized candidate sequence to produce regularized input character embeddings and regularized candidate character embeddings, respectively, a word embedding component 330 configured to embed the regularized input character embeddings and the regularized candidate character embeddings to produce an embedded input vector and an embedded candidate vector, respectively, and a scoring component 415 configured to compute a similarity score based on the embedded input vector and the embedded candidate vector.

According to some embodiments of the present disclosure, the entity matching apparatus includes a computer implemented artificial neural network (ANN) that computes a similarity score based on an embedded input vector and an embedded candidate vector of an input name and a candidate name, respectively. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments, training component 310 identifies a training pair including an input name and a candidate name, and further including a ground truth match information indicating whether the input name corresponds to the candidate name. The training component 310 then computes a loss function based on the similarity score and the ground truth match information. The training component 310 then updates parameters of the word embedding component 330 based on the loss function. In some examples, training component 310 modifies the candidate name to produce the input name for the training pair.

According to some embodiments, entity matching network 315 identifies an input name and a candidate name, where the input name and the candidate name are words formed from a natural language character set. Additionally, the entity matching network 315 indicates that the input name corresponds to the candidate name based on the similarity score. In some examples, entity matching network 315 determines that the similarity score exceeds a threshold, where the indication is based on the determination. In some examples, the input name is a misspelled version of the candidate name. Additionally or alternatively, the input name includes an infrequent or out-of-domain character sequence.

In some examples, the entity matching network 315 identifies an alternative candidate name for the input name. The entity matching network 315 also indicates that the input name does not correspond to the alternative candidate name. In one embodiment, entity matching network 315 includes character encoder 320, character embedding component 325, word embedding component 330, and scoring component 335.

According to some embodiments, character encoder 320 encodes the input name and the candidate name to produce a regularized input sequence and a regularized candidate sequence, respectively, where the regularized input sequence and the regularized candidate sequence are formed from a regularized character set having fewer characters than the natural language character set. In some examples, the character encoder 320 compares characters of the input name and the candidate name from the natural language character set. The character encoder 320 selects characters from the regularized character set for the regularized input sequence and the regularized candidate sequence based on the comparison. In some examples, the characters are selected from the regularized character set using a per position alignment method. In some examples, the regularized character set includes a matching character, a non-matching character, and at least one gap character. In some examples, the at least one gap character includes a first gap character for the input name and a second gap character for the candidate name. Character encoder 320 is an example of, or includes aspects of, the corresponding element described with reference to FIGS. 4 and 5.

According to some embodiments, character embedding component 325 embeds each character of the regularized input sequence and the regularized candidate sequence to produce regularized input character embeddings and regularized candidate character embeddings, respectively, where the embedded input vector and the embedded candidate vector are generated based on the regularized input character embeddings and the regularized candidate character embeddings, respectively. Character embedding component 325 is an example of, or includes aspects of, the corresponding element described with reference to FIGS. 4 and 5.

According to some embodiments, word embedding component 330 embeds the regularized input sequence and the regularized candidate sequence to produce an embedded input vector and an embedded candidate vector, respectively. In some examples, the embedded input vector and the embedded candidate vector are generated using a long short-term memory (LSTM). In some examples, the embedded input vector and the embedded candidate vector are generated using a transformer network (e.g., a BERT model).

According to some embodiments, word embedding component 330 is configured to embed the regularized input character embeddings and the regularized candidate character embeddings to produce an embedded input vector and an embedded candidate vector, respectively. In some examples, the word embedding component 330 includes an LSTM network. In some examples, the word embedding component 330 includes a transformer network (e.g., BERT model). Word embedding component 330 is an example of, or includes aspects of, the corresponding element described with reference to FIGS. 4 and 5.

According to some embodiments, scoring component 335 computes a similarity score based on the embedded input vector and the embedded candidate vector. In some examples, scoring component 335 generates a cosine similarity score based on the embedded input vector and the embedded candidate vector. Scoring component 335 is an example of, or includes aspects of, the corresponding element described with reference to FIG. 4.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of an entity matching network using an LSTM network according to aspects of the present disclosure. The example shown includes character encoder 400, character embedding component 405, word embedding component 410, scoring component 415, and similarity score 420.

In some embodiments, the word embedding component 410 comprises an LSTM network. An LSTM is a form of RNN that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

One or more embodiments of the present disclosure provide systems and network models for named entity search. An entity matching network is a two-stage model. The entity matching network is configured to model and match character sequences (e.g., names, or other types of entities) where not many frequent sub-sequences can be observed across different name instances. A pair of matching sequences is initially converted into a unique encoding (e.g., frequent patterns can be obtained in the encoding). In some embodiments, deep learning techniques (e.g., BERT or character-based LSTM) are then applied over the encoded sequences to compute and indicate matching results. An entity matching network using an LSTM network is illustrated in FIG. 4. Detail of an entity matching network including a transformer network is described with reference to FIG. 5. The new encoding and the subsequent character embeddings are agonistic to the exact characters in the input sequences. As a result, the entity matching network has greater generalizability to process large varieties of input sequences and produce matching results efficiently.

From top to bottom, an input name and a candidate name are input to a character encoder 400. The input name and the candidate name are formed from a natural language character set. In some examples, the natural language character set contains at least 26 characters (i.e., English alphabet of 26 letters). The character encoder 400 generates a regularized input sequence and a regularized candidate sequence as encoding for the input name and the candidate name, respectively. The regularized input sequence and the regularized candidate sequence are formed from a regularized character set having fewer characters than a natural language character set. The regularized character set includes a matching character, a non-matching character, and at least one gap character. Next, a character embedding component 405 is configured to embed each character of the regularized input sequence and the regularized candidate sequence to produce regularized input character embeddings and regularized candidate character embeddings, respectively. Character encoder 400 is an example of, or includes aspects of, the corresponding element described with reference to FIGS. 3 and 5. Character embedding component 405 is an example of, or includes aspects of, the corresponding element described with reference to FIGS. 3 and 5.

The regularized input character embeddings and the regularized candidate character embeddings are then input to a word embedding component 410. The word embedding component 410 is configured to embed the regularized input character embeddings and the regularized candidate character embeddings to produce an embedded input vector and an embedded candidate vector, respectively. In an embodiment, the word embedding component 410 includes an LSTM network. The LSTM network includes two bi-directional LSTM layers. However, the number of LSTM layers may vary and is not limited to two layers. Word embedding component 410 is an example of, or includes aspects of, the corresponding element described with reference to FIGS. 3 and 5.

The embedded input vector and the embedded candidate vector are input to a scoring component 415. The scoring component 415 is configured to compute a similarity score based on the embedded input vector and the embedded candidate vector. Scoring component 415 is an example of, or includes aspects of, the corresponding element described with reference to FIG. 3.

FIG. 5 shows an example of an entity matching network using a transformer network according to aspects of the present disclosure. The example shown includes character encoder 500, character embedding component 505, and word embedding component 510.

In some examples, a transformer network (e.g., a BERT model) may be used for structural and syntactical matching between two sequence inputs (e.g., named entities). In an embodiment, the entity matching network takes a pair of sequences as inputs and applies character embedding to the pair of sequences. The entity matching network then feeds the regularized character embeddings into a BERT model and computes a similarity score using an energy function. In some cases, the energy function includes computing a cosine similarity score.

According to an embodiment, the entity matching network includes a bi-directional encoder representations from transformers (BERT) architecture. In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference.

In some examples, the BERT model uses a masked language model (i.e., MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bi-directional transformer. In addition to the masked language model, BERT includes a next sentence prediction (NSP) task that jointly pretrains text-pair representations.

In some embodiments, input sequences (e.g., a query name and a candidate name) are mapped into regularized sequences corresponding to a new set of vocabulary derived from global sequence alignment between the two original input sequences. The new vocabulary is agnostic to the exact characters in the two input sequences and depends exclusively on the matching patterns between character pairs from the two input sequences. For example, given a user input character sequence and a candidate name, the matching pattern is a unique encoding describing one of the classes below at each position from the global sequence alignment between them. The regularized character set includes a matching character, a non-matching character, and at least one gap character. In some cases, the characters are selected from the regularized character set using a per position alignment method. The alignment patterns between the two input sequences (e.g., the input name and the candidate name) enables the creation of new regularized sequences denoting the matching patterns between the two input sequences but not the exact characters in the input sequences. The regularized sequences are light-weight and relatively simple compared to the original input sequences. One embodiment of the present disclosure uses the per-position alignment pattern in the new vocabulary and each input sequence (e.g., the input name) is converted into the corresponding pattern class with respect to the other input sequence (e.g., the candidate name). The regularized character embeddings are built upon the new regularized sequences and these regularized character embeddings are then input to deep learning models such as a transformer network (e.g., BERT) as illustrated in FIG. 5 or a LSTM network (see FIG. 4).

From top to bottom, an input name and a candidate name are input to a character encoder 500. The input name and the candidate name are words formed from a natural language character set. The character encoder 500 generates a regularized input sequence and a regularized candidate sequence as encoding for the input name and the candidate name, respectively. The regularized input sequence and the regularized candidate sequence are formed from a regularized character set having fewer characters than the natural language character set. Next, a character embedding component 505 is configured to embed each character of the regularized input sequence and the regularized candidate sequence to produce regularized input character embeddings and regularized candidate character embeddings, respectively. Character encoder 500 is an example of, or includes aspects of, the corresponding element described with reference to FIGS. 3 and 4. Character embedding component 505 is an example of, or includes aspects of, the corresponding element described with reference to FIGS. 3 and 4.

The regularized input character embeddings and the regularized candidate character embeddings are then input to a transformer network (e.g., a BERT model as shown in FIG. 5). In some cases, the regularized input character embeddings and the regularized candidate character embeddings are also collectively referred to as regularized character embeddings.

The BERT model can unambiguously represent both a single sentence and a pair of sentences in one token sequence. In some cases, a "sentence" refers to arbitrary span of contiguous text, rather than an actual linguistic sentence. A "sequence" refers to the input token sequence to the BERT model, which may be a single sentence, or two sentences packed together. In some embodiments, the regularized input character embeddings and the regularized candidate character embeddings form an input token sequence to the BERT model.

The first token of every sequence is a special classification token ([CLS]). In an embodiment, [CLS] is a special symbol added in front of the regularized character embeddings. The final hidden state corresponding to this token is used as the aggregate sequence representation for classification tasks. Sentence pairs are packed together into a single sequence. [SEP] is a special separator token to separate a first sequence and a second sequence. Additionally, the BERT model adds a learned embedding to every token indicating whether it belongs to a first sentence or a second sentence. In some examples, the regularized input character embeddings form the first sentence, and the regularized candidate character embeddings form the second sentence.

The BERT model denotes input embedding as E, the final hidden vector of the special [CLS] token as C, and the final hidden vector for the i-th input token as $T_i$. For BERT input representation, input embeddings are the sum of the token embeddings, the segmentation embeddings and the position embeddings. In an embodiment, the BERT model is configured to embed the regularized input character embeddings and the regularized candidate character embeddings to produce an embedded input vector and an embedded candidate vector, respectively. A similarity score is then computed based on the embedded input vector and the embedded candidate vector. Word embedding component 510 is an example of, or includes aspects of, the corresponding element described with reference to FIGS. 3 and 4.

Entity Matching

Figure 6:
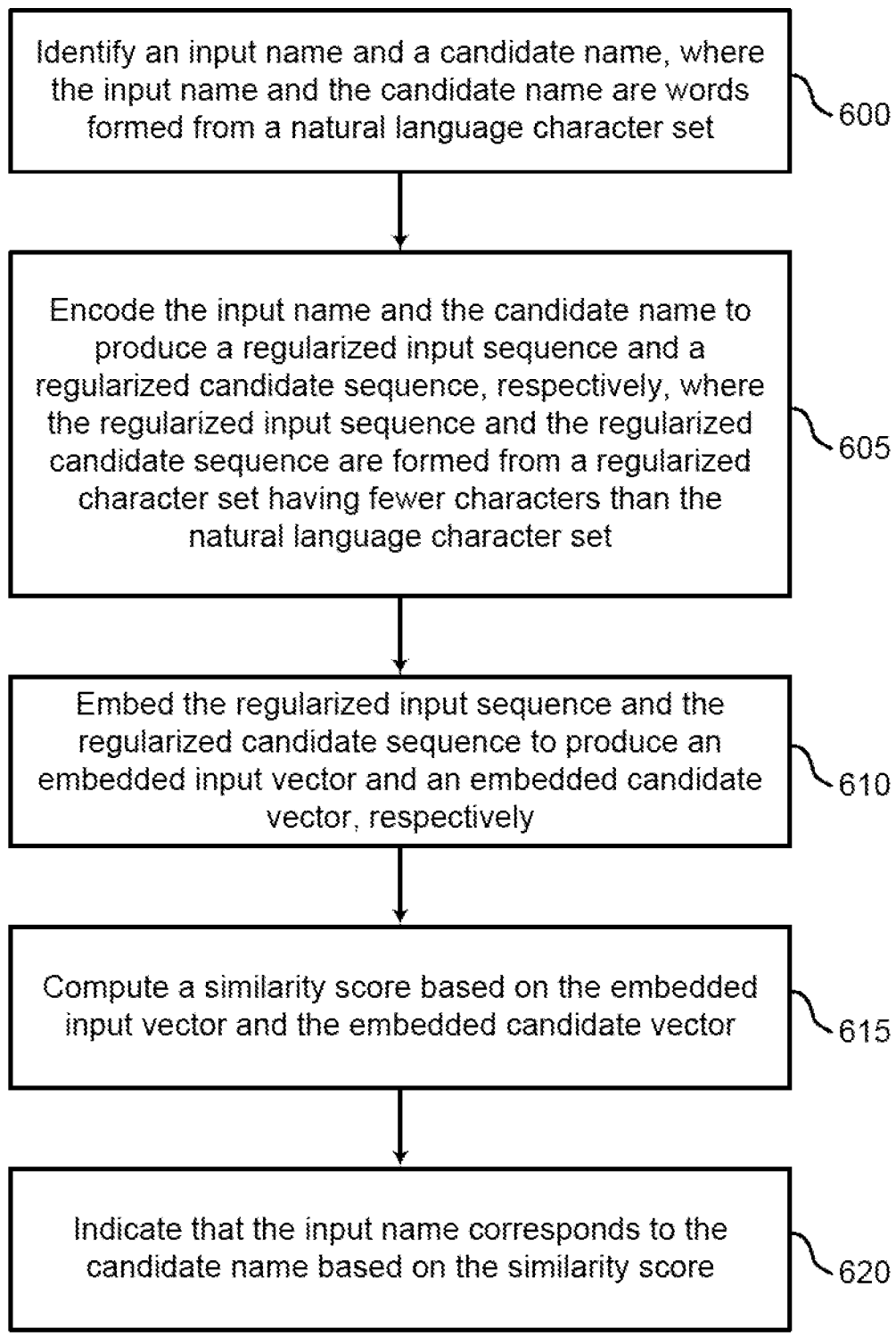
FIG. 6 shows an example of an entity matching process according to aspects of the present disclosure.
Figure 7:
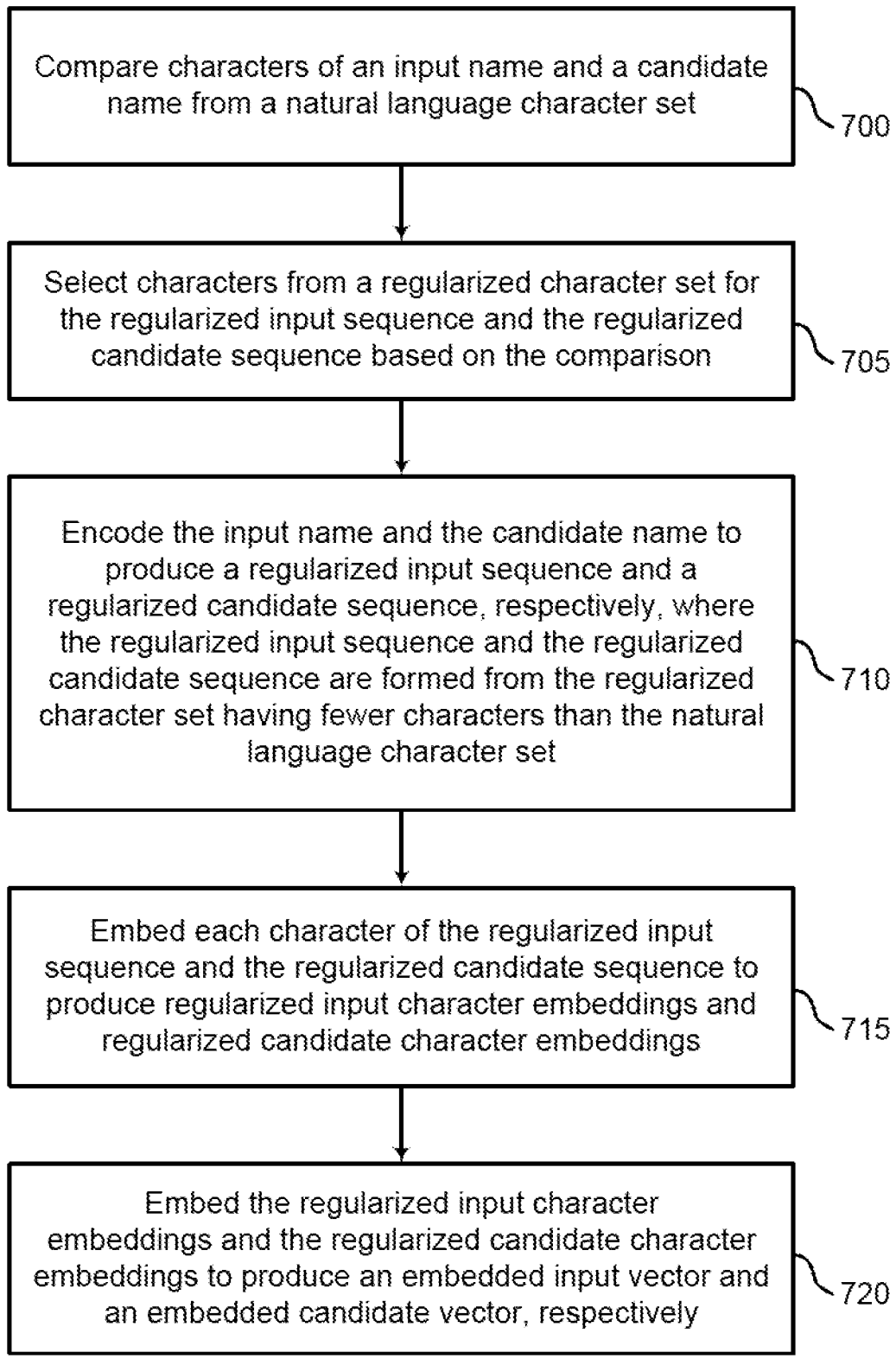
FIG. 7 shows an example of an entity matching process using a regularized character set according to aspects of the present disclosure.

In accordance with FIGS. 6 and 7, a method, apparatus, and non-transitory computer readable medium for natural language processing are described. One or more embodiments of the method, apparatus, and non-transitory computer readable medium include identifying an input name and a candidate name, wherein the input name and the candidate name are words formed from a natural language character set, encoding the input name and the candidate name to produce a regularized input sequence and a regularized candidate sequence, respectively, wherein the regularized input sequence and the regularized candidate sequence are formed from a regularized character set having fewer characters than the natural language character set, embedding the regularized input sequence and the regularized candidate sequence to produce an embedded input vector and an embedded candidate vector, respectively, computing a similarity score based on the embedded input vector and the embedded candidate vector, and indicating that the input name corresponds to the candidate name based on the similarity score.

Some examples of the method, apparatus, and non-transitory computer readable medium described above further include comparing characters of the input name and the candidate name from the natural language character set. Some examples further include selecting characters from the regularized character set for the regularized input sequence and the regularized candidate sequence based on the comparison. In some examples, the characters are selected from the regularized character set using a per position alignment method.

Some examples of the method, apparatus, and non-transitory computer readable medium described above further include embedding each character of the regularized input sequence and the regularized candidate sequence to produce regularized input character embeddings and regularized candidate character embeddings, respectively, wherein the embedded input vector and the embedded candidate vector are generated based on the regularized input character embeddings and the regularized candidate character embeddings, respectively.

In some examples, the embedded input vector and the embedded candidate vector are generated using a long short-term memory (LSTM). In some examples, the embedded input vector and the embedded candidate vector are generated using a transformer network.

Some examples of the method, apparatus, and non-transitory computer readable medium described above further include determining that the similarity score exceeds a threshold, wherein the indication is based on the determination. Some examples of the method, apparatus, and non-transitory computer readable medium described above further include generating a cosine similarity score based on the embedded input vector and the embedded candidate vector.

In some examples, the regularized character set includes a matching character, a non-matching character, and at least one gap character. In some examples, the at least one gap character comprises a first gap character for the input name and a second gap character for the candidate name. In some examples, the input name is a misspelled version of the candidate name. In some examples, the input name comprises an infrequent or out-of-domain character sequence.

Some examples of the method, apparatus, and non-transitory computer readable medium described above further include identifying an alternative candidate name for the input name. Some examples further include indicating that the input name does not correspond to the alternative candidate name.

FIG. 6 shows an example of an entity matching process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system identifies an input name and a candidate name, where the input name and the candidate name are words formed from a natural language character set. In some cases, the operations of this step refer to, or may be performed by, an entity matching network as described with reference to FIG. 3.

At operation 605, the system encodes the input name and the candidate name to produce a regularized input sequence and a regularized candidate sequence, respectively, where the regularized input sequence and the regularized candidate sequence are formed from a regularized character set having fewer characters than the natural language character set. In some cases, the operations of this step refer to, or may be performed by, a character encoder as described with reference to FIGS. 3-5.

In some embodiments, the system computes a unique encoding for the input name and the candidate name, respectively. The regularized character set includes a matching character, a non-matching character, and at least one gap character. The entity matching network uses a per-position alignment pattern from the regularized character set (i.e., a new vocabulary) and converts an input sequence (e.g., an input name) into the corresponding pattern class with respect to the other input sequence (e.g., a candidate name).

In an example, an input name is "Jon Doe", and a selected candidate name is "John Doe", then the regularized sequence encoding is {match, match, gap, match, match, match, match, match}. An alignment process may be performed to determine which characters from the input align with characters from the candidate (or vice versa). A gap character may be inserted based on the alignment. The candidate name may be a filename stored in a database that a user searches for.

In another example, an input name is "J_ _ _ Doe", and a candidate name is "John Doe". "J_ _ _ Doe" may be a misspelled version of the candidate name "John Doe". A character encoder of the entity matching network generates a regularized input sequence (e.g., M, G1, G1, G1, M, M, M, M). In the example, "G1" denotes an empty character matched with a non-empty character. The character encoder also generates a regularized candidate sequence (e.g., M, G2, G2, G2, M, M, M, M). In the example, "G2" denotes a non-empty character matched with an empty character.

At operation 610, the system embeds the regularized input sequence and the regularized candidate sequence to produce an embedded input vector and an embedded candidate vector, respectively. In some cases, the operations of this step refer to, or may be performed by, a word embedding component as described with reference to FIGS. 3-5.

In some embodiments, the system includes a deep learning model to produce an embedded input vector and an embedded candidate vector based on the regularized input sequence and the regularized candidate sequence, respectively. For example, a transformer network (e.g., BERT) or an LSTM network is trained to identify structural and syntactic variations and perform named entity matching. The performance is dependent on observing frequent subsequences across character sequences. In some cases, search terms or queries follow a power-law distribution and there is a long tail of infrequent character sequences and input spelling noises in search terms. In some examples, the LSTM and the transformer network (e.g., BERT) may be used for structural and syntactical matching between two sequence inputs (e.g., named entities).

In an embodiment, the system takes a pair of an input name and a candidate name as input, then applies character embedding to the pair to produce regularized input character embeddings and regularized candidate character embeddings. The system then inputs the regularized input character embeddings and the regularized candidate character embeddings to a deep learning model (BERT or LSTM) and computes a similarity score using an energy function. In some cases, the energy function includes computing a cosine similarity score.

In an embodiment, the regularized input character embeddings and the regularized candidate character embeddings are input to a word embedding component (e.g., an LSTM network). The regularized input character embeddings and the regularized candidate character embeddings are two different inputs to a same copy of LSTM network.

At operation 615, the system computes a similarity score based on the embedded input vector and the embedded candidate vector. In some cases, the operations of this step refer to, or may be performed by, a scoring component as described with reference to FIGS. 3 and 4. In an embodiment, the similarity score includes a cosine similarity score based on the embedded input vector and the embedded candidate vector.

Cosine similarity measures the similarity between two vectors of an inner product space. It is measured by the cosine of the angle between two vectors (e.g., the embedded input vector and the embedded candidate vector). The scoring component is configured to determine whether these two vectors are pointing in roughly the same direction. In some cases, cosine similarity is used to measure document similarity in text analysis.

In an embodiment, cosine similarity is a measure of similarity that is used to compare or provide a ranking of a set of candidate names with respect to a given vector of query (e.g., an input name or an input sequence). Let x and y be two vectors, for example, x denotes the embedded input vector and y denotes the embedded candidate vector. The cosine measure as a similarity function is formulated as follows:

$$sim(x, y) = \frac{x \cdot y}{\|x\|\|y\|} \qquad (1)$$

where $\|x\|$ is the Euclidean norm of vector $x=(x_1, x_2, \ldots, x_p)$, $\|y\|$ is the Euclidean norm of vector $y=(y_1, y_2, \ldots, y_p)$.

In an embodiment, the scoring component computes the cosine of the angle between vectors x and y (i.e., the embedded input vector and the embedded candidate vector). A cosine value of 0 means that the two vectors are at 90 degrees to each other (orthogonal) and have no match between the input name and the candidate name. The closer the cosine value to 1, the smaller the angle and the greater the match between the two vectors.

At operation 620, the system indicates that the input name corresponds to the candidate name based on the similarity score. The system determines that the similarity score computed above exceeds a threshold. The entity matching network then indicates that the input name corresponds to the candidate name, where the indication is based on the determination. In some cases, the system determines that the similarity score computed above fails to exceed a threshold and the entity matching network then indicates that the input name does not correspond to the candidate name. In some cases, the operations of this step refer to, or may be performed by, an entity matching network as described with reference to FIG. 3.

FIG. 7 shows an example of an entity matching process using a regularized character set according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system compares characters of an input name and a candidate name from a natural language character set. In some examples, a user searches for a list of filenames that may contain the input name. However, the user does not remember or fails to input the correct spelling of the filename (e.g., the input name is a misspelled version of the candidate name, or the input name comprises an infrequent or out-of-domain character sequence). For example, the input name is "J_ _ _ Doe" and a candidate name is "John Doe". In some cases, the operations of this step refer to, or may be performed by, a character encoder as described with reference to FIGS. 3-5.

At operation 705, the system selects characters from a regularized character set for the regularized input sequence and the regularized candidate sequence based on the comparison. In an embodiment, the regularized character set includes a matching character, a non-matching character, and at least one gap character. In some cases, the operations of this step refer to, or may be performed by, a character encoder as described with reference to FIGS. 3-5.

At operation 710, the system encodes the input name and the candidate name to produce a regularized input sequence and a regularized candidate sequence, respectively, where the regularized input sequence and the regularized candidate sequence are formed from a regularized character set having fewer characters than the natural language character set.

In the example above, a character encoder of the entity matching network generates a regularized input sequence for the input name. The character encoder also generates a regularized candidate sequence for the candidate name. In some cases, the operations of this step refer to, or may be performed by, a character encoder as described with reference to FIGS. 3-5.

At operation 715, the system embeds each character of the regularized input sequence and the regularized candidate sequence to produce regularized input character embeddings and regularized candidate character embeddings, respectively corresponding to the input character embeddings. In some cases, the operations of this step refer to, or may be performed by, a character embedding component as described with reference to FIGS. 3-5.

At operation 720, the system embeds the regularized input character embeddings and the regularized candidate character embeddings to produce an embedded input vector and an embedded candidate vector, respectively. In some cases, the operations of this step refer to, or may be performed by, a word embedding component as described with reference to FIGS. 3-5. In an embodiment, the word embedding component includes a transformer network (e.g., BERT). As an alternative, the word embedding component includes an LSTM network.

The regularized input character embeddings and the regularized candidate character embeddings are input to a deep learning embedding network (e.g., BERT, LSTM) and the embedding network computes a similarity score using an energy function. In some cases, the energy function includes computing a cosine similarity score.

Training and Evaluation

Figure 8:
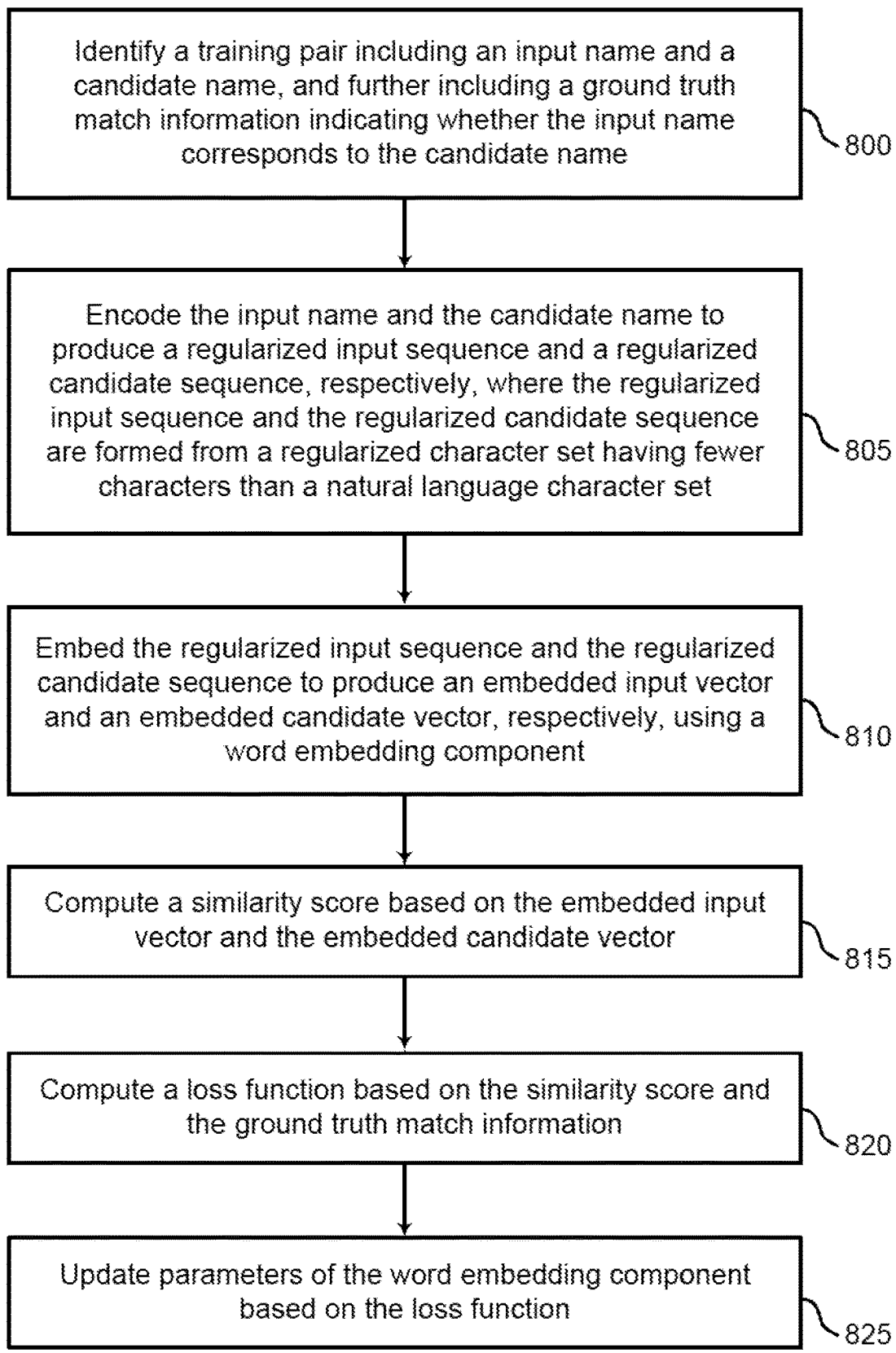
FIG. 8 shows an example of a process for training an entity matching network according to aspects of the present disclosure.

In accordance with FIG. 8, a method, apparatus, and non-transitory computer readable medium for training a machine learning model are described. One or more embodiments of the method, apparatus, and non-transitory computer readable medium include identifying a training pair comprising an input name and a candidate name, and further comprising a ground truth match information indicating whether the input name corresponds to the candidate name, encoding the input name and the candidate name to produce a regularized input sequence and a regularized candidate sequence, respectively, wherein the regularized input sequence and the regularized candidate sequence are formed from a regularized character set having fewer characters than a natural language character set, embedding the regularized input sequence and the regularized candidate sequence to produce an embedded input vector and an embedded candidate vector, respectively, using a word embedding component, computing a similarity score based on the embedded input vector and the embedded candidate vector, computing a loss function based on the similarity score and the ground truth match information, and updating parameters of the word embedding component based on the loss function.

Some examples of the method, apparatus, and non-transitory computer readable medium described above further include embedding each character of the regularized input sequence and the regularized candidate sequence to produce regularized input character embeddings and regularized candidate character embeddings, respectively, wherein the embedded input vector and the embedded candidate vector are generated based on the regularized input character embeddings and the regularized candidate character embeddings, respectively.

Some examples of the method, apparatus, and non-transitory computer readable medium described above further include modifying the candidate name to produce the input name for the training pair.

FIG. 8 shows an example of a process for training an entity matching network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

Accordingly, during the training process, the parameters and weights of an entity matching apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 800, the system identifies a training pair including an input name and a candidate name, and further including a ground truth match information indicating whether the input name corresponds to the candidate name. In some cases, the operations of this step refer to, or may be performed by, a training component as described with reference to FIG. 3.

At operation 805, the system encodes the input name and the candidate name to produce a regularized input sequence and a regularized candidate sequence, respectively, where the regularized input sequence and the regularized candidate sequence are formed from a regularized character set having fewer characters than a natural language character set. In some cases, the operations of this step refer to, or may be performed by, a character encoder as described with reference to FIGS. 3-5.

At operation 810, the system embeds the regularized input sequence and the regularized candidate sequence to produce an embedded input vector and an embedded candidate vector, respectively, using a word embedding component. The embedded input vector and the embedded candidate vector are then input to a scoring component to produce a similarity score. In some cases, the operations of this step refer to, or may be performed by, a word embedding component as described with reference to FIGS. 3-5.

At operation 815, the system computes a similarity score based on the embedded input vector and the embedded candidate vector. In some cases, the operations of this step refer to, or may be performed by, a scoring component as described with reference to FIGS. 3 and 4. In an embodiment, the scoring component produces a cosine similarity score based on the embedded input vector and the embedded candidate vector.

At operation 820, the system computes a loss function based on the similarity score and the ground truth match information. In some cases, the operations of this step refer to, or may be performed by, a training component as described with reference to FIG. 3.

In some examples, a supervised training model may be used that includes a loss function that compares predictions of the entity matching network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are mode during the next iteration.

At operation 825, the system updates parameters of the word embedding component based on the loss function. In some cases, the operations of this step refer to, or may be performed by, a training component as described with reference to FIG. 3.

Performance of apparatus, systems, and methods of the present disclosure have been evaluated, and results indicate that embodiments of the present disclosure provide an improvement over existing technology. One or more embodiments provide an entity matching network that increases prediction accuracy on the production name matching dataset. In some examples, the customized name matching dataset has name pairs with a large number of structural and syntactic variations between the pairs and all these name pairs contain unique character sequences that are not found in the training data. For example, the entity matching network increases accuracy by 12% for a LSTM network (69% to 81%) and 14% for a BERT model (72% to 86%), demonstrating increased performance for named entity search and similar NLP tasks.

One objective is to evaluate how well baseline models and the entity matching network of the present disclosure work for matching name pairs when there are syntactical and structural variations between the pairs. In some examples, the training data consists of 150K name pairs and the test data consists of 35K name pairs, where each pair contains a name and a structural/syntactical variation of the name. Network models are evaluated on whether they can accurately determine if the name variation is a match for a given name or not. To train the LSTM and BERT model, the name pairs are used as inputs to embedding layers of the respective deep learning model. To train the entity matching network with regularized embeddings, the name pairs are converted to regularized sequence encoding to normalize infrequent sequences and use the regularized sequences as inputs to the LSTM or BERT.

The experiments demonstrate that regularized sequence encoding significantly increases accuracy especially for infrequent name sequences (e.g., increase performance of BERT by 14% and LSTM by 12% on large-scale dataset). Given the wide range of name search applications (e.g., Adobe® PDF), embodiments of the present disclosure provide methods, systems, and apparatus of applying name search at-scale to larger varieties of user search inputs that capture both frequent and infrequent search terms.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
identifying an input name and a candidate name, wherein the input name and the candidate name are words formed from a natural language character set;
encoding the input name based on the candidate name to produce a regularized input sequence;
encoding the candidate name based on the input name to produce a regularized candidate sequence, wherein the regularized input sequence and the regularized candidate sequence are formed by selecting characters from a regularized character set having fewer characters than the natural language character set, wherein the regularized character set includes a matching character indicating a match between a character of the input name and a character of the candidate name;
embedding characters of the regularized input sequence and characters of the regularized candidate sequence to produce regularized input character embeddings and regularized candidate character embeddings, respectively;
combining the regularized input character embeddings and the regularized candidate character embeddings to produce an input token sequence;
generating an embedded input vector and an embedded candidate vector based on the input token sequence;
computing a similarity score based on the embedded input vector and the embedded candidate vector; and
generating a matching result indicating whether the input name corresponds to the candidate name based on the similarity score.

2. The method of claim 1, further comprising:
comparing the character of the input name and the character of the candidate name; and
selecting a character from the regularized character set for the regularized input sequence based on the comparison.

3. The method of claim 2, wherein:
the characters are selected from the regularized character set using a per position alignment method.

4. The method of claim 1, wherein:
the embedded input vector and the embedded candidate vector are generated using a transformer network.

5. The method of claim 1, further comprising:
determining that the similarity score exceeds a threshold, wherein the indication is based on the determination.

6. The method of claim 1, wherein computing the similarity score further comprising:
generating a cosine similarity score based on the embedded input vector and the embedded candidate vector.

7. The method of claim 1, wherein:
the regularized character set includes the matching character, a non-matching character, and at least one gap character.

8. The method of claim 7, wherein:
the at least one gap character comprises a first gap character for the input name and a second gap character for the candidate name.

9. The method of claim 1, wherein:
the input name is a misspelled version of the candidate name.

10. The method of claim 1, further comprising:
identifying an alternative candidate name for the input name; and
indicating that the input name does not correspond to the alternative candidate name.

11. The method of claim 1, further comprising:
generating an aggregate sequence representation based on a special symbol of the input token sequence other than the regularized input character embeddings and the regularized candidate character embeddings, wherein the matching result is based on the aggregate sequence representation.

12. The method of claim 1, further comprising:
obtaining an additional input name;
encoding the additional input name based on the candidate name to produce an additional regularized input sequence;
encoding the candidate name based on the additional input name to produce an additional regularized candidate sequence, wherein the additional regularized input sequence and the additional regularized candidate sequence are formed by selecting characters from the regularized character set;
generating an additional embedded input vector and an additional embedded candidate vector based on the additional regularized input sequence and the additional regularized candidate sequence; and
generating the matching result indicating whether the additional input name corresponds to the candidate name based on the additional embedded input vector and the additional embedded candidate vector.

13. An apparatus for natural language processing, comprising:
a character encoder configured to encode an input name based on a candidate name to produce a regularized input sequence and encode the candidate name based on the input name to produce a regularized candidate sequence, wherein the regularized input sequence and the regularized candidate sequence are formed by selecting characters from a regularized character set having fewer characters than a natural language character set of the input name and the candidate name, wherein the regularized character set includes a matching character indicating a match between a character of the input name and a character of the candidate name;
a character embedding component configured to embed each characters of the regularized input sequence and characters of the regularized candidate sequence to produce regularized input character embeddings and regularized candidate character embeddings, respectively;
a word embedding component configured to combine the regularized input character embeddings and the regularized candidate character embeddings to produce an input token sequence, and embed the input token sequence to produce an embedded input vector and an embedded candidate vector; and
a scoring component configured to compute a similarity score based on the embedded input vector and the embedded candidate vector, and generate a matching result indicating whether the input name corresponds to the candidate name based on the similarity score.

14. The apparatus of claim 13, wherein:
the word embedding component comprises a long short-term memory (LSTM) network.

15. The apparatus of claim 13, wherein:
the word embedding component comprises a transformer network.

16. The apparatus of claim 13, wherein:
the regularized character set includes the matching character, a non-matching character, and at least one gap character.

17. A method for training a machine learning model, comprising:
- identifying a training pair comprising an input name and a candidate name, and further comprising a ground truth match information indicating whether the input name corresponds to the candidate name;
- encoding the input name based on the candidate name and the candidate name based on the input name to produce a regularized input sequence and a regularized candidate sequence, respectively, wherein the regularized input sequence and the regularized candidate sequence are formed by selecting characters from a regularized character set having fewer characters than a natural language character set, wherein the regularized character set includes a matching character indicating a match between a character of the input name and a character of the candidate name;
- embedding characters of the regularized input sequence and characters of the regularized candidate sequence to produce regularized input character embeddings and regularized candidate character embeddings using a word embedding component;
- combining the regularized input character embeddings and the regularized candidate character embeddings to produce an input token sequence;
- generating an embedded input vector and an embedded candidate vector based on the input token sequence;
- computing a similarity score based on the embedded input vector and the embedded candidate vector;
- computing a loss function based on the similarity score and the ground truth match information; and
- updating parameters of the word embedding component based on the loss function.

18. The method of claim 17, further comprising:
modifying the candidate name to produce the input name for the training pair.

* * * * *